Aug. 12, 1969  V. I. VILL ET AL  3,460,734

FRICTION WELDING MACHINE

Filed June 2, 1964  5 Sheets-Sheet 1

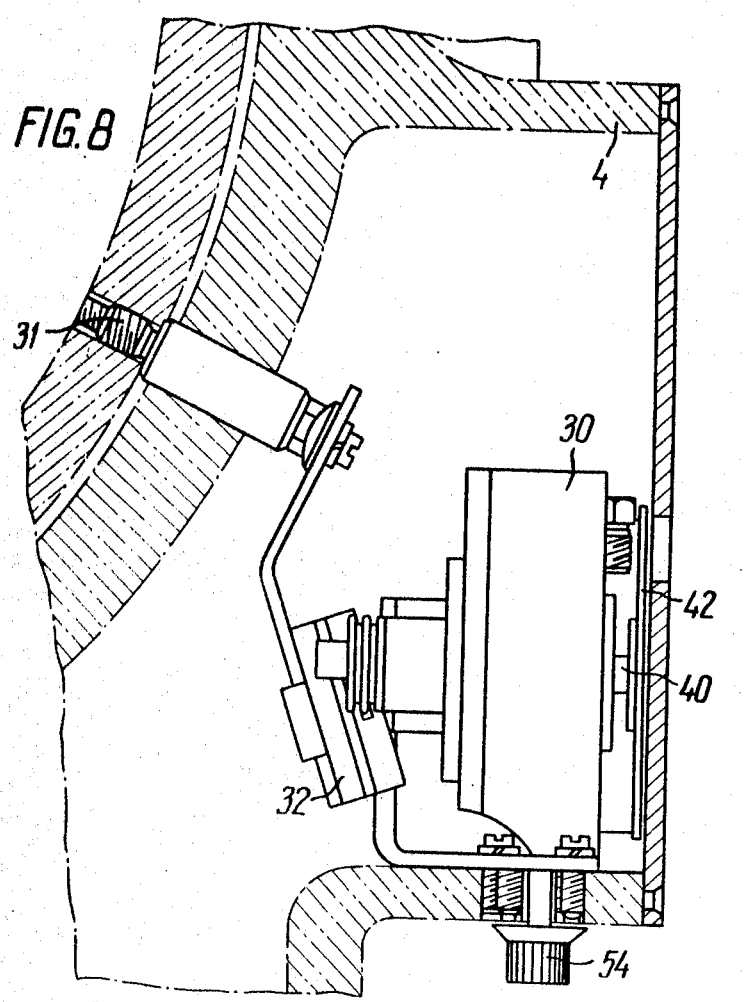
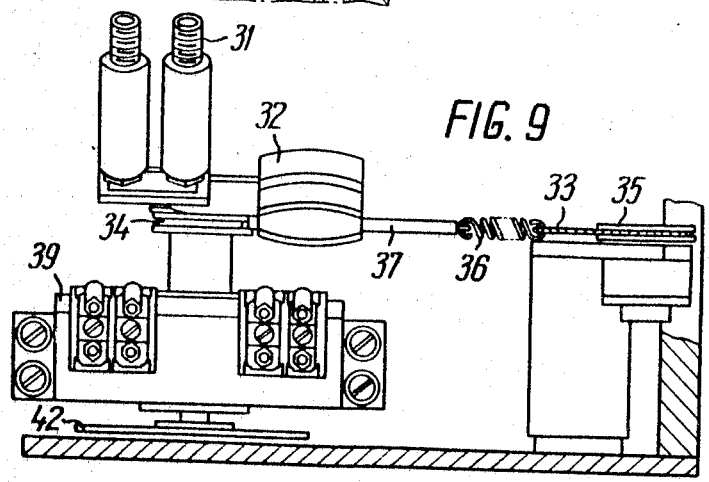

United States Patent Office 3,460,734
Patented Aug. 12, 1969

3,460,734
FRICTION WELDING MACHINE
Vadim Ivanovich Vill, Nikolai Jakovlevich Kochanovsky, Semen Moiseevich Tazba, Miron Matveevich Shpeizman, and Lev Alexandrovich Shternin, Leningrad, U.S.S.R., assignors to Vsesouzny Nauchno-Issledovatelsky Institute Elektrosvarochnogo oborudovanija, Leningrad, U.S.S.R.
Filed June 2, 1964, Ser. No. 372,054
Int. Cl. B23k 27/00
U.S. Cl. 228—2     3 Claims

ABSTRACT OF THE DISCLOSURE

A friction welding machine for workpieces including a stationary element on the machine, a headstock and a tailstock mounted on the stationary element, in which a rotatable spindle is mounted in the headstock for free axial displacement, and means for clamping one of the workpieces arranged on the spindle. Further means for clamping the other workpiece is arranged on the tailstock coaxially with the first clamping means whereby axial displacement and rotation of the spindle effects axial and rotary movement of one workpiece relative to the other workpiece for heating the workpieces to be welded. Each of the clamping means includes jaw means located on the spindle and tailstock respectively, and two V-shaped prisms arranged in the jaw means and embracing the workpieces to be welded. Two power-actuated wedges mounted on the spindle and tailstock respectively are operative for moving the V-shaped prisms axially for effecting a primary clamping of the workpieces with the V-shaped prisms being adapted to move axially in the jaw means when the welding thrust is applied to the workpieces as a result of the axial displacement of the spindle during the heating cycle for finally clamping the workpieces.

---

This invention relates to friction welding machines for welding metal workpieces and more particularly to machines comprising a headstock provided with a spindle, and a tailstock housing arrangement for clamping the work to be welded.

Recently, a new method of butt welding-friction welding, which is a species of pressure butt welding, has found wide application in industry.

In friction welding, the ends of the workpieces are heated to a plastic condition by the friction of the end of one rotating workpiece against that of a second stationary workpiece, and the workpieces are kept in alignment with and held against each other with the necessary axial thrust.

An object of the present invention is to provide a friction welding machine including means for imparting both rotary and progressive movement to one workpiece only while maintaining the second workpiece stationary.

For accomplishing this object, the present machine is provided with means for ensuring the rotation, clamping, axial travel and the required axial or welding thrust of one of the workpieces located within the headstock and more specifically includes two pneumatic or hydraulic cylinders housed within the headstock to be concentric with and embrace the spindle, with one cylinder developing the required axial thrust and ensuring upsetting and the second cylinder clamping the workpiece to be welded.

The second clamping means is stationary so that during the welding process and setting-up of the machine, the workpiece clamped therein cannot rotate or travel axially whereby the workpiece can be of any length, shape or mass.

Moreover, the use of stops for preventing the displacement of the workpieces on being subjected to axial or welding thrusts is eliminated, as the design of the clamping means automatically ensures the development of a clamping force sufficiently greater than the axial thrust acting on the workpieces being welded. Each clamping means consists of two sliding V-shaped prisms and two driving wedges which shift the V-shaped prisms in a direction perpendicular to the axis of the workpieces during the preliminary clamping of the workpieces. The workpieces are finally clamped after the sliding V-shaped prisms are moved parallel to the axis of the workpieces, and which movement is effected with the aid of the headstock spindle when the latter is subjected to axial or welding thrust.

Figure 1:
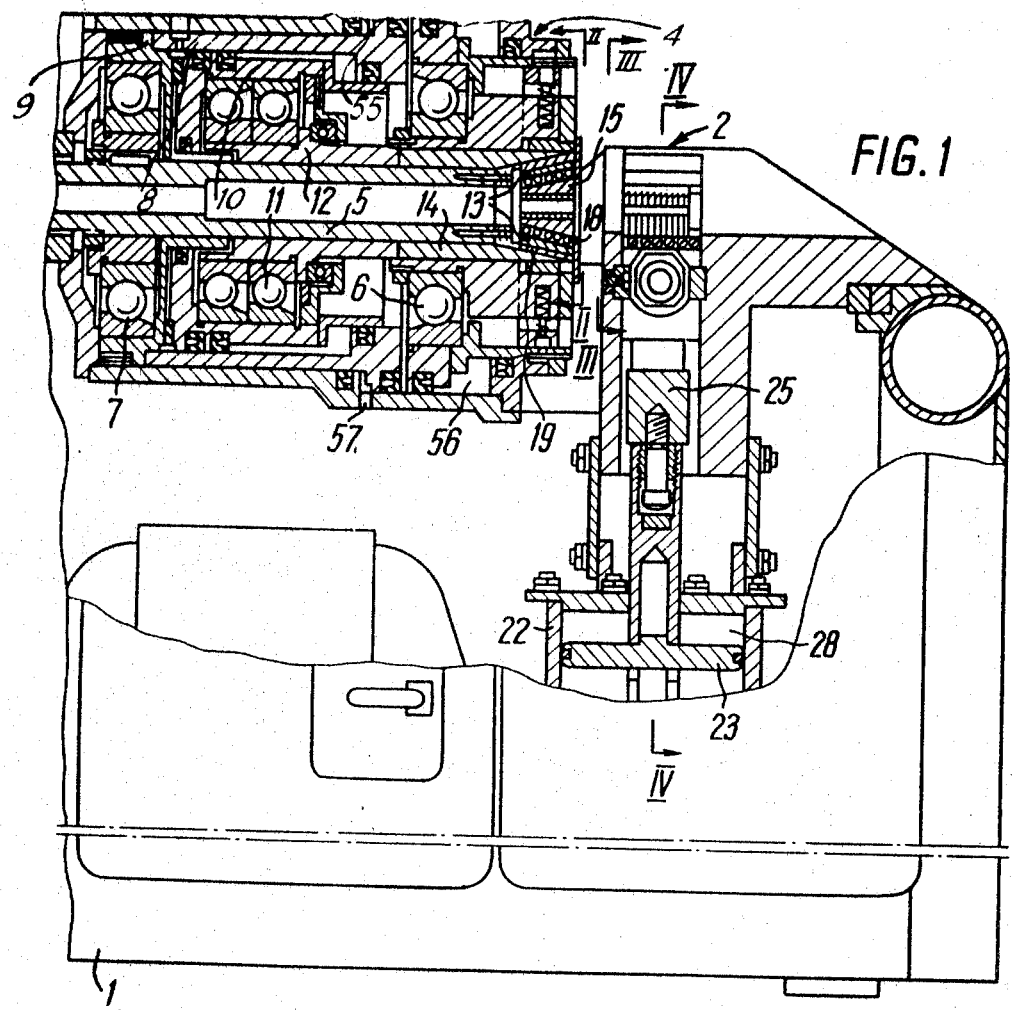
Figure 2:
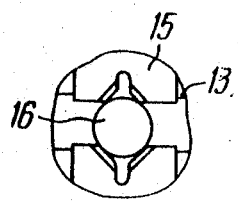
Figure 3:
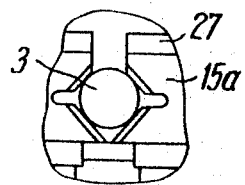
Figure 10:
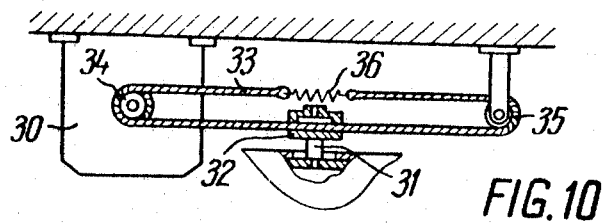
Figure 4:
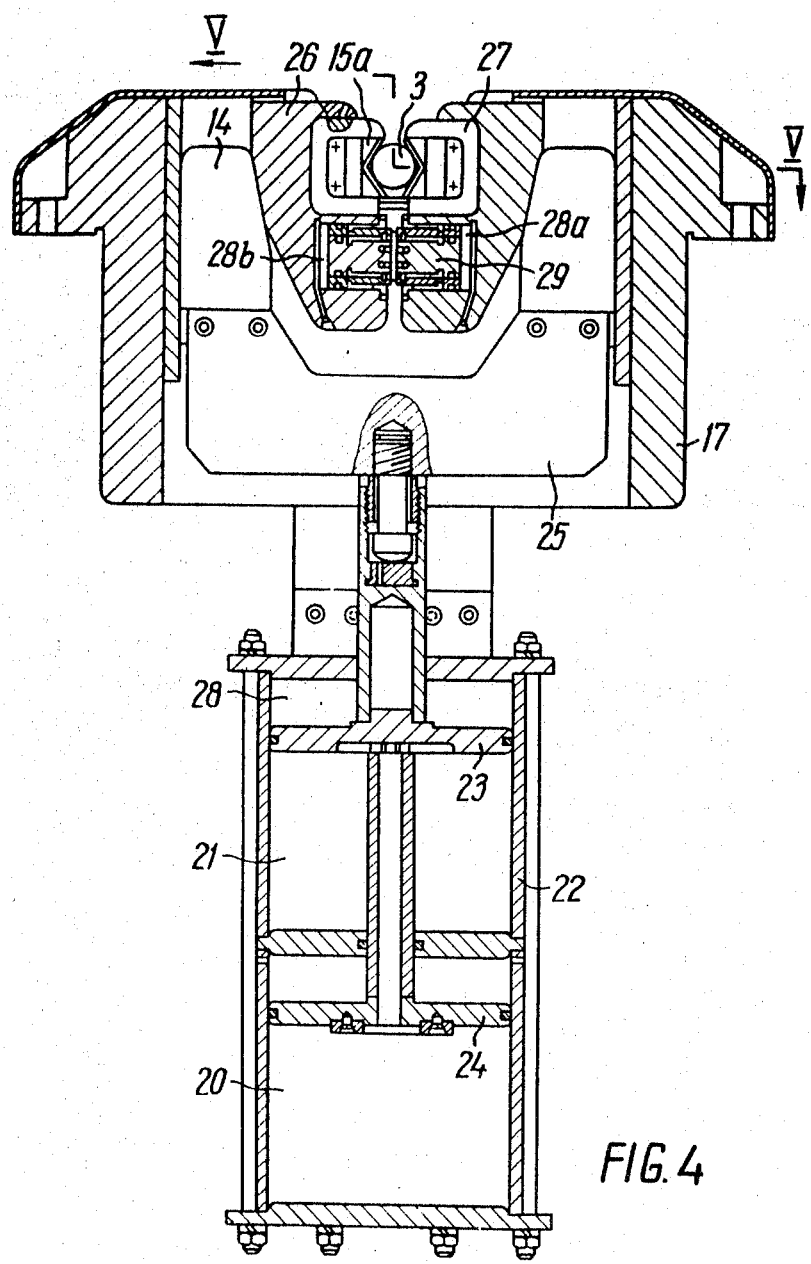
Figure 5:
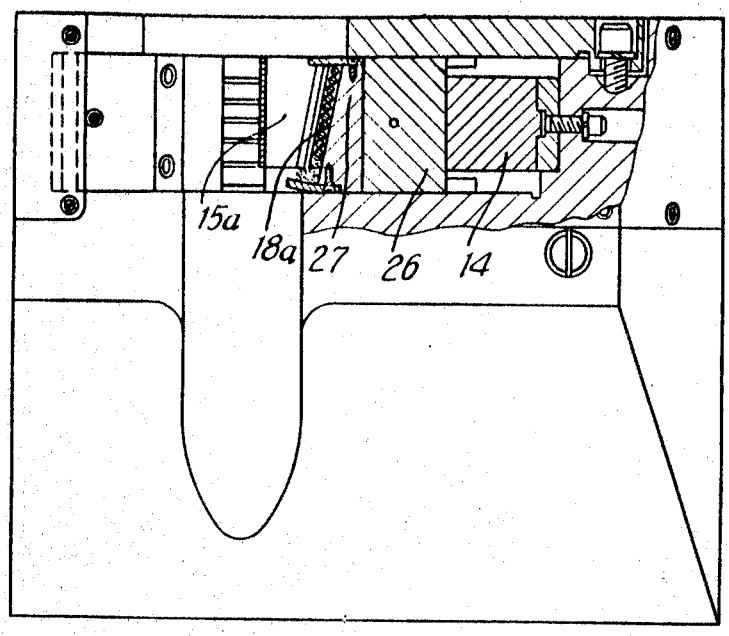
Figure 6:
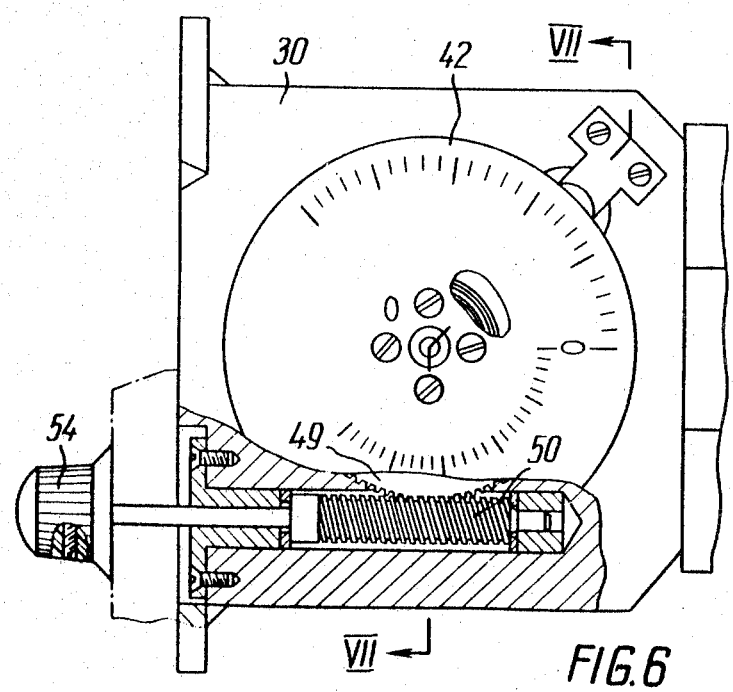
Figure 7:
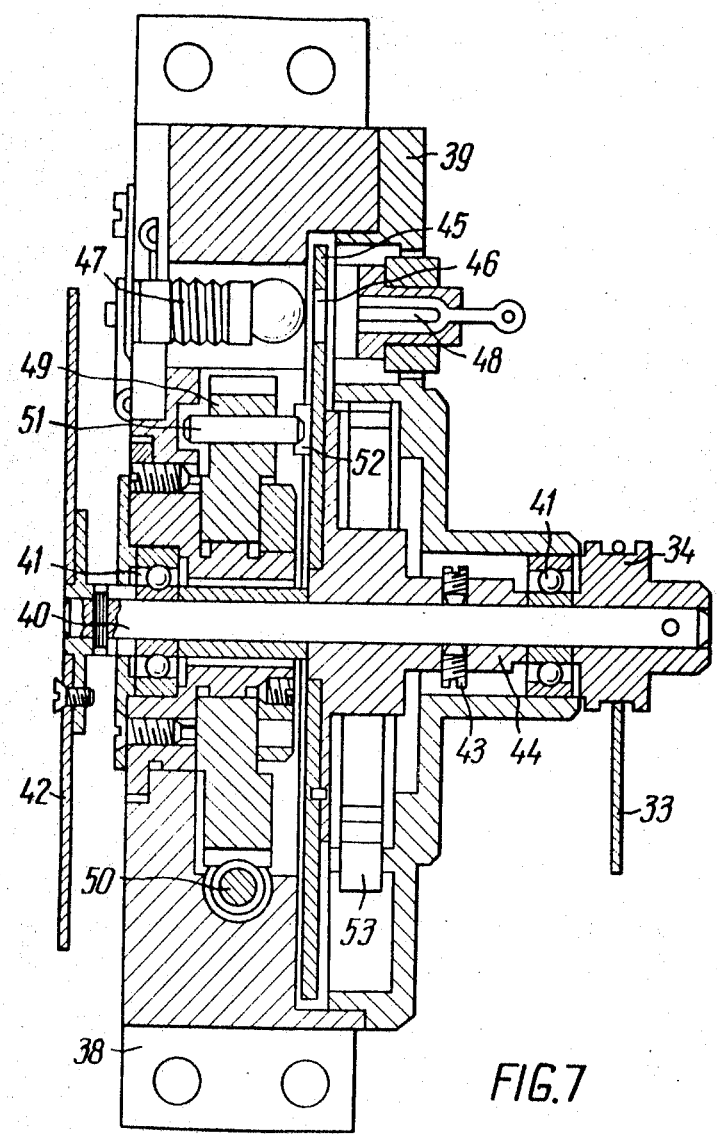

Further objects and advantages of the invention will become more readily apparent to persons skilled in the art from the following detailed description and annexed drawings, and in which drawings:

FIG. 1 is a front view partly in elevation and partly in cross section of a welding machine embodying the invention, FIG. 2 is a view looking in the direction of arrow A in FIG. 1, FIG. 3 is a view looking in the direction of arrow B in FIG. 1, FIG. 4 is a view taken along line 3—3 of FIG. 1, the view being on a larger scale, FIG. 5 is a view taken along the line D—E—F—G of FIG. 4, FIG. 6 is a side view partly in elevation and partly in cross section of the follower, FIG. 7 is a view taken along line K—O—M of FIG. 6, the view being on a larger scale, FIG. 8 is a view partly in elevation and partly in cross section of the control desk, FIG. 9 is a longitudinal view partly in elevation and partly in cross section of the control desk, and FIG. 10 is a plan view thereof partly broken away.

As shown in FIG. 1, the machine includes a bed 1, the right-hand section of which accommodates a tailstock 2 provided with the gear for clamping a stationary workpiece 3 (FIG. 3) and the left-hand section accommodates a headstock 4 in which along its axis is located a spindle 5 driven by suitable means and supported by two bearings 6. The spindle is installed in a movable piston 8 and cover 9 secured to the piston. Between the bearings 6 and within the piston 8 is located a piston 10 in which are mounted duplex ball bearings 11 on a bushing 12 mounted on the spindle 5. The spindle is designed so that its right-hand section acts as a two-jaw chuck, and jaws 13 thereof are actuated by two wedges 14 attached to the bushing 12.

The workpiece is clamped in the headstock in two stages. First, after the working medium has shifted the piston 10 to the right and, therewith, the bushing 12 and wedges 14 through bearings 11 and movement of wedges 14 compresses the jaws 13 thus preliminarily clamping the work by V-shaped prisms 15 (FIG. 2). The force pressing jaws 13 to the V-shaped prisms ensures that the V-shaped prisms grip the workpiece with a pressure sufficient to prevent its rotation and axial displacement upon being subjected to torque and axial thrust.

The axial thrust developed by the pressure of the working medium against the piston 8 is transmitted to a workpiece 16 (FIG. 2), clamped by the V-shaped prisms 15 and the end of which thrusts against the end of the stationary workpiece 3 held in a clamping means 17 (FIG. 4). This thrust will result in a certain axial displacement of V-shaped prisms 15 and 15a and, due to the taper of the latter, will automatically increase the clamping pressure on the workpieces. Antifriction means such as, for example, rollers 18a (FIG. 5) are mounted between the jaws 13 and V-shaped prisms 15 to reduce friction losses and ensure a maximum clamping pressure.

The length of travel of the wedges 14 is selected to permit the clamping of work of various diameters without having to reset the machine. When resetting the machine for welding workpieces of a different diameter, shims 19 should be changed. The clamping means 17 for the stationary workpiece located in the tailstock 2 is similar in construction to that in the headstock. More specifically, it consists of two V-shaped prisms 15a between which the workpiece 3 is inserted. The working medium is fed simultaneously to chambers 20 and 21 (FIG. 4) of a cylinder 22 and raises pistons 23 and 24 together with a fork 25 attached to the piston 23. As the fork raises, jaws 26, which are grooved to hold jaws 27, rollers 18a (FIG. 5) and V-shaped prism 15a, are drawn together, thereby aligning the workpiece with the axis of the machine and also preliminarily clamping the workpiece.

From the foregoing description, it is clear that the clamping means in the headstock for the rotating workpiece and in the tailstock for the stationary workpiece are similar in design, differing only in that in the former arrangement the wedges 14 are located along the axis of the work, whereas wedges 14a in the tailstock clamping means are located inside the fork 25, and the function thereof is similar to that of the wedges in the headstock which are located perpendicular to the axis of the workpiece. The working faces of the V-shaped prisms are serrated to minimize the pressure developed by the working medium in the above-described clamping means. Moreover, the axial thrust developed at the commencement of the welding process is usually very small and increases gradually with the result that the forces tending to rotate and displace the work along its axis are likewise too insignificant to displace the clamped workpiece.

After the preliminary clamping, the workpieces are drawn to and pressed against each other with a force or axial thrust necessary for heating their ends during rotation. This axial thrust pushes the workpieces, together with the V-shaped prisms 15, 15a forward to a slight extent, because the teeth of the latter bite into the work. This movement results in a clamping pressure several times greater than the total axial thrust. Any change in the axial thrust will immediately result in a corresponding, proportional change in the clamping pressure. The clamps are disengaged on the completion of the welding operation by relieving the pressure in chambers 20 and 21. Simultaneously, the working medium is delivered into chamber 28, as well as into chambers 28a and 28b. The working medium on entering the chamber 28 will depress the pistons 23 and 24 and the work 25 attached to the piston 23. When the fork 25 lowers, the working medium in chambers 28a and 28b cause telescopic pistons 29 (FIG. 4) to separate jaws 27 with their V-shaped prisms, thus releasing the clamped workpiece and conditioning the clamping means for receiving a new workpiece.

These self-clamping arrangements likewise automatically ensure the self-centering and alignment of the workpieces.

Inside a boss (not shown) on the housing of the headstock 4, and under the control panel (not shown), is located the upest control gear assembly. This assembly includes a follower 30 (FIGS. 7, 8 and 10) secured to the headstock housing 4, two pins 31 threaded into the headstock piston 8 (FIG. 8), a diaphragm-type air-operated clamp 32 mounted on the pins 31, a cable 33 trained about pulley 34 of the follower, and pulley 35 suitably secured to the headstock housing. The ends of the cable 33 are held together by a spring 36 (FIG. 10). The cable is rigidly attached (for instance, soldered) to a tube 37 slipped thereover and has its end flattened. This tube is adapted to pass through the diaphragm-type air-operated clamp 32.

In addition, the cable 33 is trained twice about the pulley 34 to which it is secured so that the rotation of the pulley will force the cable to move and the motion of the cable will force the pulley 34 to rotate.

The follower 30 is designed for ensuring a constant, predetermined upsetting length after the ends of the workpieces are heated during the friction welding operation. It is located in a housing 38 provided with a cover 39 and along the center-line of which is located a shaft 40 mounted between two ball bearings 41.

A scale 42 is rigidly attached to one end of the shaft 40 which projects from housing 38 and the pulley 34 is similarly attached to the opposite projecting end of the shaft. A bushing 45a, to which is riveted a rotating shutter 45, is secured with screws 43 to the middle of the shaft 40 within the housing 38 and cover 39. This shutter is provided with an aperture 46 to the left of which is located a light source 47 and to the right a photo cell 48. Both the light source and photo cell are located concentrically with respect to the aperture 46.

Within the housing 38 and coaxial with the shaft 40 is mounted a worm wheel 49 which meshes with a worm gear 50. A pin 51 is pressed into the worm wheel 49 and contacts a stop 52 on the shutter 45. A contact between the pin 51 and stop 52 on shutter 45 is ensured by spiral spring 53, one end of which is attached to the shutter 45 and its other end to the cover 39.

As previously mentioned, the length of the workpieces to be upset during the heating of the ends is set or predetermined with the aid of the follower 30 prior to initiation of the operating cycle. This is accomplished by rotating a knob 54 (FIG. 6) on the end of worm gear 50. During rotation, the worm gear turns worm wheel 49 and pin 51 is thereby forced against the stop 52 of the rotating shutter 45. This action rotates the shutter 45 and shaft 40 to which the worm wheel is secured, and the scale 42 attached to the shaft. The worm gear 50 is turned until the division of the scale indicating the predetermined upsetting length during the heating of the workpiece coincides with the index under the inscription "HarpeB" (heat) on the control desk panel.

At the commencement of heating and as soon as the ends of the pieces to be welded press against each other and the pressure of the working medium in chamber 55 (FIG. 1) of headstock 4 commences to rise, the working medium flows into air-operated diaphragm clamp 32 which clamps the tube 37, thus moving both clamp and tube to the right. As a result, after a part of the heated metal is extruded to form flash, the piston 8, which is connected to the clamp 32 through the pins 31, will be forced to the right. The tube 37 travelling to the right, pulls the cable 33 which turns pulley 34 and, consequently, rotates the shutter 45 until the aperture 46 of the latter concides with the light source 47.

The zero division of the scale 42 of the follower will now be opposite the index on the control desk panel. As soon as the light from source 49 impinges on the photo cell 48, the latter sends a signal to stop the rotation of the headstock spindle 5 together with its workpiece, and increase the oil pressure in the headstock chamber (FIG. 1). The increase of pressure in the headstock chamber 55 results in the further extrusion of heated metal to form flash and the further travel of the headstock piston 8, clamp 32, tube 37 and cable 33.

This movement of the cable rotates pulley 34 and scale 42 and the division to the right of the zero on the scale coinciding with the inscription "npokoBka" (welding peen) on the control desk panel will indicate the length of the work to be upset during the peening. Thus, the total length of upsetting during the welding operation is equal to the sum of the predetermined upsetting length of the work during heating plus the length upset during weld peening.

After the completion of the welding process, the pressure in chamber 55 is relieved and bypassed to headstock chambers 56 and 57, thereby releasing workpiece 16 and returning pistons 8 and 10 to their initial positions. Simultaneously, the pressure in clamp 32 is relieved, thereby releasing tube 37 and cable 33, whereby spring 36 rotates pulley 34 and shutter 45, thereby returning such components and tube 37 to their initial positions. The shutter 45 is returned to its initial position due to the fact that when tube 37 and cable 33 are shifted to the right, it is rotated under the action of spiral spring 53, which is coiled during the assembly of the machine and further coiled during the heating and "peening" of the workpieces until its stop 52 thrusts against the pin 51 on worm wheel 49.

The invention is not to be confined to any strict conformity to the showings in the drawings but changes or modifications may be made therein so long as such changes or modifications mark no material departure from the spirit and scope of the appended claims.

What we claim is:

1. A friction welding machine for workpieces comprising a stationary element for the machine, a headstock and a tailstock mounted on the stationary element, a rotatable spindle mounted in the headstock for free axial displacement, means for clamping one of the workpieces arranged on the spindle, further means for clamping the other workpiece arranged on said tailstock coaxially with said first clamping means whereby rotation of said spindle effects axial and rotary movement of said one workpiece relative to the other workpiece for heating said workpieces to be welded, each of said clamping means including jaw means located on said spindle and tailstock, respectively, two V-shaped prisms arranged in said jaw means and embracing the workpieces to be welded, and two power actuated wedges mounted on said spindle and tailstock, respectively operative for moving said V-shaped prisms axially for effecting a primary clamping of the workpieces with said V-shaped prisms being adapted to move axially in said jaw means when a welding thrust is applied to the workpieces as a result of the axial displacement of the spindle during the heating cycle for finally clamping the workpieces.

2. The machine as claimed in claim 1 including anti-friction means located between the adjoining surfaces of the V-shaped prisms and the jaw means.

3. The machine as claimed in claim 1 including a follower for stopping the heating of the workpieces to be welded, said follower having a body mounted on the stationary element of the machine, a photocell and a light source suported within said body, a shutter having an aperture arranged within the body between the photocell and light source, a bearing supported roller on which said shutter is rigidly mounted, and means kinematically coupling the roller to said spindle only after the ends of the workpieces to be welded are brought into contact.

References Cited

UNITED STATES PATENTS

| 3,044,328 | 7/1962 | Zysk | 228—3 |
| 3,235,158 | 2/1966 | Hollander | 228—2 |
| 3,235,160 | 2/1966 | Walton | 228—2 |

RICHARD H. EANES, JR., Primary Examiner